(12) United States Patent  (10) Patent No.: US 8,437,536 B2
Saito  (45) Date of Patent: May 7, 2013

(54) ENVIRONMENT RECOGNITION SYSTEM

(75) Inventor: Toru Saito, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 1141 days.

(21) Appl. No.: 12/320,353

(22) Filed: Jan. 23, 2009

(65) Prior Publication Data

US 2009/0190827 A1  Jul. 30, 2009

(30) Foreign Application Priority Data

Jan. 25, 2008 (JP) ................................. 2008-014584

(51) Int. Cl.
*G06K 9/00* (2006.01)

(52) U.S. Cl.
USPC .......................................................... 382/154

(58) Field of Classification Search ................... 382/103, 382/154
See application file for complete search history.

(56) References Cited

U.S. PATENT DOCUMENTS

| | | | |
|---|---|---|---|
| 5,304,980 A | | 4/1994 | Maekawa |
| 5,410,346 A | * | 4/1995 | Saneyoshi et al. ............ 348/116 |
| 5,519,618 A | | 5/1996 | Kastner et al. |
| 5,529,139 A | | 6/1996 | Kurahashi et al. |
| 5,611,406 A | | 3/1997 | Matsuzaki et al. |
| 6,122,597 A | * | 9/2000 | Saneyoshi et al. ............ 701/301 |
| 6,215,898 B1 | | 4/2001 | Woodfill et al. |
| 6,370,261 B1 | | 4/2002 | Hanawa |
| 6,477,260 B1 | | 11/2002 | Shimomura |
| 6,487,304 B1 | | 11/2002 | Szeliski |
| 6,594,378 B1 | | 7/2003 | Li et al. |
| 6,690,451 B1 | | 2/2004 | Schubert |
| 6,714,672 B1 | | 3/2004 | Berestov et al. |
| 6,909,802 B2 | | 6/2005 | Nakamura |
| 6,990,216 B2 | | 1/2006 | Yamamura |
| 7,376,247 B2 | | 5/2008 | Ohta et al. |
| 7,526,120 B2 | | 4/2009 | Gokturk et al. |

(Continued)

FOREIGN PATENT DOCUMENTS

| | | |
|---|---|---|
| JE | 2004226197 A | 8/2004 |
| JP | 5-114099 | 5/1993 |

(Continued)

OTHER PUBLICATIONS

U.S. Office Action issued for co-pending U.S. Appl. No. 12/320,352 dated Oct. 17, 2012.

(Continued)

*Primary Examiner* — Alex Liew
(74) *Attorney, Agent, or Firm* — Smith, Gambrell and Russell, LLP

(57) ABSTRACT

An environment recognition system includes image taking means for taking a pair of images of an object in a surrounding environment with a pair of cameras and outputting the pair of images, stereo matching means for conducting stereo matching on a plurality of pairs of images that are taken by different image taking methods or that are formed by subjecting the pair of taken images to different image processing methods and forming distance images respectively for the pairs of images, selection means for dividing the distance images into a plurality of sections, calculating representative parallaxes respectively for the sections, and selecting any of the representative parallaxes of the corresponding section as a representative parallax of the section, and detection means for detecting the object in the image on the basis of the representative parallaxes of the sections.

20 Claims, 12 Drawing Sheets

U.S. PATENT DOCUMENTS

| | | |
|---|---|---|
| 7,756,299 B2 | 7/2010 | Higaki |
| 7,924,316 B2 | 4/2011 | Silverstein et al. |
| 7,966,327 B2 | 6/2011 | Li et al. |
| 8,045,782 B2 | 10/2011 | Li et al. |
| 8,147,503 B2 | 4/2012 | Zhao et al. |
| 2002/0024517 A1 | 2/2002 | Yamaguchi et al. |
| 2003/0091225 A1 | 5/2003 | Chen |
| 2003/0160866 A1 | 8/2003 | Hori et al. |
| 2003/0185421 A1 | 10/2003 | Okamoto et al. |
| 2004/0101162 A1* | 5/2004 | Higaki et al. .......... 382/103 |
| 2004/0151396 A1 | 8/2004 | Nomura et al. |
| 2004/0208357 A1* | 10/2004 | Tokuhashi et al. ........ 382/154 |
| 2005/0047656 A1 | 3/2005 | Luo et al. |
| 2005/0105765 A1 | 5/2005 | Han et al. |
| 2005/0117781 A1 | 6/2005 | Aoyama |
| 2006/0171566 A1 | 8/2006 | Gindele et al. |
| 2006/0212215 A1 | 9/2006 | Koulinitch |
| 2006/0227862 A1 | 10/2006 | Campbell et al. |
| 2006/0239537 A1 | 10/2006 | Shragai et al. |
| 2007/0110289 A1 | 5/2007 | Fu et al. |
| 2008/0089557 A1 | 4/2008 | Iwaki et al. |
| 2008/0107306 A1 | 5/2008 | Matsuzawa |
| 2008/0117093 A1 | 5/2008 | Ichiyanagi et al. |
| 2008/0253617 A1 | 10/2008 | Ernst et al. |
| 2008/0298719 A1 | 12/2008 | Sengupta et al. |
| 2009/0060256 A1 | 3/2009 | White et al. |
| 2009/0060280 A1 | 3/2009 | Choi et al. |
| 2009/0067728 A1 | 3/2009 | Mishima et al. |
| 2009/0136091 A1 | 5/2009 | Woodfill et al. |
| 2009/0141967 A1 | 6/2009 | Hattori |
| 2009/0154566 A1 | 6/2009 | Kondo et al. |
| 2009/0190800 A1 | 7/2009 | Takahashi |
| 2009/0190827 A1 | 7/2009 | Saito |
| 2009/0243823 A1* | 10/2009 | Takahashi ............ 340/435 |
| 2010/0020074 A1 | 1/2010 | Taborowski et al. |

FOREIGN PATENT DOCUMENTS

| | | |
|---|---|---|
| JP | 5-265547 | 10/1993 |
| JP | 6-266828 | 9/1994 |
| JP | 10-283461 | 10/1998 |
| JP | 10-283477 | 10/1998 |
| JP | 10-285582 | 10/1998 |
| JP | 2003-255430 | 9/2003 |
| JP | 2006-72495 | 3/2006 |
| JP | 2009133753 A | 6/2009 |
| JP | 2001-43377 | 2/2011 |

OTHER PUBLICATIONS

U.S. Notice of Allowability issued for co-pending U.S. Appl. No. 12/320,352 dated Apr. 19, 2012.

* cited by examiner $T_0$ $T_c$ $T_z(T_z1)$ $TE_0$ $TE_c$ $TE_z(T_z2)$

ENVIRONMENT RECOGNITION SYSTEM

CROSS-REFERENCE TO RELATED APPLICATIONS

The disclosure of Japanese Patent Application No. 2008-014584 filed on Jan. 25, 2008 including the specification, drawings and abstract is incorporated herein by reference in its entirety.

BACKGROUND OF THE INVENTION

1. Field of the Invention

The present invention relates to environment recognition systems, and more particularly, to an environment recognition system that recognizes a surrounding environment by detecting objects in a taken image.

2. Description of the Related Art

In general, in order to measure the distance to an object existing in a surrounding environment with a stereo camera, a pair of images are taken by a pair of right and left cameras that are mounted at the same height, and one of the taken images used for reference (hereinafter referred to as a reference image $T_o$) is compared with the other image (hereinafter referred to as a comparative image $T_c$). By comparison, a difference between corresponding positions of the same object in the images, that is, a parallax is calculated, and the distance to the object is calculated from the parallax. The positions in the reference image and the comparative image where an image of the same object is included are typically located by stereo matching (for example, see Japanese Unexamined Patent Application Publication Nos. 10-283461 and 10-283477).

In stereo matching, as shown in FIG. 17, a reference image $T_o$ is divided into small regions (hereinafter referred to as reference pixel blocks $PB_o$) each defined by a predetermined number of pixels, such as 3 by 3 pixels or 4 by 4 pixels. An epipolar line EPL is set in the vertical position in the comparative image $T_c$ corresponding to each reference pixel block $PB_o$, and a brightness pattern of the reference pixel block $PB_o$ is compared with a brightness pattern of a comparative pixel block $PB_c$ that exists on the epipolar line EPL and that has the same shape as that of the reference pixel block $PB_o$.

In this case, for example, a SAD (Sum of Absolute Difference) value is calculated as a difference in the brightness pattern according to the following Expression (1):

$$SAD = \sum_{s,t} |p1st - p2st| \quad (1)$$

where $p1st$ represents the brightness of the pixel in the reference pixel block $PB_o$ in the reference image $T_o$, and $p2st$ represents the brightness of the pixel in the comparative pixel block $PB_c$ in the comparative image $T_c$. Of SAD values that are less than or equal to a preset threshold value, a comparative pixel block $PB_c$ that provides the smallest SAD value is specified as a comparative pixel block in the comparative image $T_c$ that includes an image of the same object as that included in the reference pixel block $PB_o$.

A parallax dp between the comparative pixel block $PB_c$ specified in the comparative image $T_c$ and the original reference pixel block $PB_o$ in the reference image $T_o$ is calculated, and a distance Z to the object at the reference pixel block $PB_o$ is calculated on the basis of the parallax dp according to the principle of triangulation. On the basis of the calculated distance Z, the object is detected from the surrounding environment.

It is confirmed that this object detection method that calculates the parallax dp by stereo matching of the reference image $T_o$ and the comparative image $T_c$ and calculates the distance Z to the object functions without any trouble in a normal image taking environment and can effectively detect the object from the surrounding environment, as disclosed in the above-described publications.

However, for example, when the stereo camera is placed in a backlit environment, a reference image $T_o$ shown in FIG. 18A is bright because backlight enters the image, while a comparative image $T_c$ shown in FIG. 18B taken in the same scene is totally darker than the reference image $T_o$ because backlight is blocked by a building or the like and much backlight does not enter the image.

When the brightness balance between a pair of cameras is thus disturbed, the difference between the brightness $p1st$ of the pixel in the reference pixel block $PB_o$ in the reference image $T_o$ and the brightness $p2st$ of the pixel in the comparative pixel block $PB_c$ in the comparative image $T_c$ in Expression (1) described above generally increases. Therefore, the calculated SAD value increases above the above-described threshold value. In this case, the parallax dp is not effectively calculated, and the number of reference pixel blocks $PB_o$ to be rejected increases.

For this reason, in data image (hereinafter referred to as a distance image $T_z$) formed by assigning calculated parallaxes dp to the pixel blocks $PB_o$ in the reference image $T_o$, little data on effective parallaxes dp is provided, as shown in FIG. 19. In this case, it is sometimes difficult to detect objects, and reliability of the object detection result decreases. In the worst case, little data on effective parallaxes dp is included in the obtained distance image $T_z$, and it is completely impossible to detect objects.

In this case, for example, a reference edge image $TE_o$ shown in FIG. 20A is formed by calculating differences in the brightness $p1ij$ between pixels belonging to the reference image $T_o$ shown in FIG. 18A and pixels adjacent on the right or left side. Similarly, a comparative edge image $TE_c$ shown in FIG. 20B is formed from the comparative image $T_c$ shown in FIG. 18B. The edge image $TE_o$ and the comparative edge image $TE_c$ can be subjected to stereo matching.

By subjecting the reference edge image $TE_o$ and the comparative edge image $TE_c$ thus formed to stereo matching, a distance image $TE_z$ in which a relatively large amount of data on effective parallaxes dp are included (hereinafter a distance image based on the edge images is referred to as an edge distance image) is obtained, as shown in FIG. 21. In this case, objects can sometimes be effectively detected even when it is difficult to effectively detect the objects by directly conducting stereo matching on the original reference and comparative images $T_o$ and $T_c$. FIGS. 20A, 20B, and 21 illustrate parts of the reference edge image $TE_o$, the comparative edge image $TE_c$, and the edge distance image $TE_z$.

However, edge processing has a problem in that much information is lost when obtaining the differences in brightness between the adjacent pixels. That is, when the difference in brightness is 30 in 256 brightness levels, it is unclear whether the difference of 30 indicates a difference between 50 and 80 or between 200 and 230. Moreover, this amplifies noise components in the reference image $T_o$ and the comparative image $T_c$.

Further, since the difference in brightness only in a width corresponding to one or several pixels is found, information about low-frequency components in the frequency components in the reference image $T_O$ and the comparative image $T_c$ is lost. Therefore, mismatching easily occurs. Further, it is difficult to obtain effective information, for example, about a wall that is not characteristic in structure and pattern and an asphalt road surface.

In this way, although edge processing is effective, as described above, it should be avoided to always detect objects only on the basis of an edge distance image $TE_z$ that is formed by stereo matching of a reference edge image $TE_O$ and a comparative edge image $TE_c$ obtained by subjecting a reference image $T_O$ and a comparative image $T_c$ to edge processing.

When objects are detected only on the basis of the distance image $T_z$ obtained from the reference image $T_O$ and the comparative image $T_c$, objects can be effectively and accurately detected from the surrounding environment in a normal image taking condition, as described above. However, it is undeniable that object detection is difficult in the above-described special condition.

SUMMARY OF THE INVENTION

The present invention has been made in view of these circumstances, and an object of the invention is to provide an environment recognition system that effectively detects objects and recognizes a surrounding environment.

In order to solve the above-described problems, an environment recognition system according to an aspect of the present invention includes image taking means for taking a pair of images of the same object in a surrounding environment with a pair of cameras and for outputting the pair of images; stereo matching means for conducting stereo matching on each of a plurality of pairs of images taken by different image taking methods or each of a plurality of pairs of images formed by subjecting a pair of taken images to different image processing methods, and for forming distance images in a one-to-one correspondence with the plurality of pairs of images by assigning calculated parallaxes to pixel blocks in the images; selection means for dividing the distance images into a plurality of vertical strip sections, calculating representative parallaxes respectively for the sections, selecting any of the representative parallaxes of corresponding sections in the distance images, and selecting the representative parallax for each of the sections, and detection means for detecting the object in the images on the basis of the representative parallaxes of the sections.

In this case, a plurality of distance images are obtained by conducting stereo matching on a plurality of pairs of images that are formed by processing a pair of taken images to different image processing methods. Each of the distance images is divided into a plurality of sections, and a representative parallax that satisfies the condition most is selected as a representative parallax of the section. For this reason, the most excellent representative parallax can be extracted as a representative parallax of the section from the representative parallaxes based on the distance images. For example, even in a situation in which it is difficult to extract a representative parallax in a certain section of the distance image on the basis of only one of the pairs of images, extraction can be compensated for by data on the section in the other pair of images.

In this way, a representative parallax of each section can be reliably extracted by selecting the superior one of the representative parallaxes. On the basis of the extracted data, objects, such as a preceding vehicle, can be effectively detected, and the surrounding environment can be recognized accurately.

Preferably, the plurality of pairs of images taken by the different image taking methods are a plurality of pairs of images taken by changing an image taking condition of the image taking means.

By taking a pair of images by changing the image taking condition of the image taking means, a plurality of pairs of images having can be obtained under different image taking conditions. A superior representative parallax can be selected from representative parallaxes calculated on the basis of the pairs of images thus obtained, and the above-described advantage of the present invention can be achieved reliably.

Preferably, the plurality of pairs of images formed by subjecting the pair of taken images to the different image processing methods are pairs of images taken by the image taking means, pairs of images obtained by subjecting the pair of taken images to edge processing, pairs of images formed by making resolutions of the pair of taken images different, or pairs of images formed by making brightnesses of the pair of taken images different.

In this case, the plurality of pairs of images formed by processing the pair of taken images by different image processing methods are pairs of images taken by the image taking means, pairs of images obtained by subjecting the pair of taken images to edge processing, pairs of images formed by making resolutions of the pair of taken images different, or pairs of images formed by making brightnesses of the pair of taken images different. Thus, a plurality of pairs of images can be formed by different image processing methods. The superior representative parallax can be selected from representative parallaxes calculated on the basis of the obtained pairs of images, and the above-described advantages of the present invention can be achieved reliably.

Preferably, the selection means forms the pairs of images by changing a threshold value at which noise is removed from the distance images.

In this case, since the pairs of images are formed by changing the threshold value at which noise is removed from the distance image, a plurality of pairs of images having different threshold values for noise removal can be obtained. A superior representative parallax can be selected from the representative parallaxes calculated on the basis of the pairs of images thus obtained, and the above-described advantages of the present invention can be achieved reliably.

Preferably, a pixel width of the sections is different between the distance images formed on the basis of the taken pair of images, and the selection means calculates representative parallaxes respectively for the sections, selects any of the representative parallaxes of the corresponding section as a representative parallax of the section, and selects a representative parallax for each of the sections.

By changing the pixel width of the sections of the distance images formed from the pair of taken images, a plurality of parallaxes can be obtained for the sections having different pixel widths. A superior representative parallax can be selected from the representative parallaxes thus obtained, and the above-described advantages of the present invention can be achieved reliably.

Preferably, the selection means forms a histogram for each of the sections of the distance images formed respectively for the pairs of images, and calculates the mode of the histogram as the representative parallax on the basis of frequencies of the parallaxes in the histogram.

By forming a histogram for each of the sections of the distance images formed for the pairs of images, and calculating the mode of the histogram as the representative parallax, the representative parallax can be easily and accurately calculated, and the above-described advantages of the present invention can be achieved reliably.

Preferably, the selection means selects, from the representative parallaxes of the corresponding section in the distance images formed for the pairs of images, any of a representative parallax having the highest frequency, a representative parallax based on a histogram having the smallest variance, a representative parallax having the largest mode, and a representative parallax that provides the shortest distance to the object in a current sampling period estimated from a position of the object detected in a previous sampling period, and sets the selected representative parallax as a representative parallax of the section.

When the representative parallax having the highest frequency is thus selected as a representative parallax of the section, the representative parallax can be selected accurately and quickly. When the representative parallax based on the histogram having the smallest variance is selected, it can be selected with little influence of noise. When the representative parallax having the largest mode is selected, the representative parallax closest to the image taking means can be selected. When the representative parallax that provides the shortest distance to the object in the current sampling period estimated from the position of the object detected in the previous sampling period is selected as the representative parallax of the section, the object can be detected stably.

By thus determining the method for selecting a representative parallax of the section in accordance with the condition required for object detection, a representative parallax that meets the condition can be selected, and the above-described advantages of the present invention can be achieved reliably.

Preferably, the selection means forms a plurality of histograms for each of the sections of the distance images, the histograms being different in at least one of the maximum value, the minimum value, and a class width, and calculates the representative parallax for each of the histograms.

An environment recognition system according to another aspect of the present invention includes image taking means for taking a pair of images of the same object in a surrounding environment with a pair of cameras and outputting the pair of images; stereo matching means for conducting stereo matching on the pair of taken images and forming a distance image by assigning calculated parallaxes to pixel blocks in the images; selection means for dividing the distance image into a plurality of vertical strip sections, calculating a plurality of representative parallaxes for each of the sections, and selecting any of the representative parallaxes of each of the sections as a representative parallax of the section; and detection means for detecting the object in the images on the basis of the representative parallaxes of the sections. The plurality of representative parallaxes are calculated on the basis of a plurality of the distance images that are different in a threshold value at which noise is removed from the distance images.

An environment recognition system according to a further aspect of the present invention includes image taking means for taking a pair of images of the same object in a surrounding environment with a pair of cameras and outputting the pair of images; stereo matching means for conducting stereo matching on the pair of images and for forming a distance image by assigning calculated parallaxes to pixel blocks in the taken images; selection means for dividing the distance image into a plurality of vertical strip sections, calculating a plurality of representative parallaxes for each of the sections, and selecting any of the representative parallaxes of each of the sections as a representative parallax of the section; and detection means for detecting the object in the images on the basis of the representative parallaxes of the sections. The plurality of representative parallaxes are calculated by changing a pixel width of the section of the distance image.

An environment recognition system according to a still further aspect of the present invention includes image taking means for taking a pair of images of the same object in a surrounding environment with a pair of cameras and outputting the pair of images; stereo matching means for conducting stereo matching on the pair of images and for forming a distance image by assigning calculated parallaxes to pixel blocks in the images; selection means for dividing the distance image into a plurality of vertical strip sections, calculating a plurality of representative parallaxes for each of the sections, and selecting any of the representative parallaxes of each of the sections as a representative parallax of the section; and detection means for detecting the object in the images on the basis of the representative parallaxes of the sections. The selection means forms a histogram for each of the sections, calculates the mode of the parallaxes in the histogram as the representative parallax, and calculates the plurality of representative parallaxes by using a plurality of histograms that are different in at least one of the maximum value, the minimum value, and a class width, as the histogram for each of the sections.

In the above cases, a plurality of representative parallaxes can be obtained for the same section in the distance image by changing at least one of the maximum value, the minimum value, and the class width in a histogram formed for each of the sections of the distance image. Further, a superior representative parallax can be selected from the representative parallaxes thus obtained, and the above-described advantages of the present invention can be achieved reliably.

Preferably, the selection means selects any of the representative parallaxes to which a predetermined weight is assigned.

By selecting the representative parallax with a predetermined weight, selection can be equally performed from the representative parallaxes that are different in the number of data for calculation, or a preferential representative parallax can be easily selected by increasing the weight to be applied thereto. By determining the weight in accordance with the condition required for object detection, a representative parallax that satisfies the condition can be selected for each section, and the above-described advantages of the present invention can be achieved reliably.

Preferably, the image taking method for obtaining the pair of images, the image processing method for the pair of images, or a method for processing the distance image is switched.

Preferably, the image taking method, the image processing method, or the method for processing the distance image is switched in accordance with the surrounding environment.

When the image taking method, the image processing method, or the method for processing the distance image is switched, particularly in accordance with the surrounding environment, the representative parallax can be calculated by switching the image taking method or the like so as to satisfy the condition required for object detection. In particular, when the surrounding environment changes, for example, from the daytime to the nighttime, the representative parallax can be calculated by switching the image taking method or the like that is suitable for a specific environment (e.g., the daytime) to an image taking method or the like that is suitable for another specific environment (e.g., the nighttime). By thus switching the image taking method or the like in accordance with the surrounding environment, the object can be accurately detected from the surrounding environment, and the above-described advantages of the present invention can be achieved reliably.

Preferably, the object is a three-dimensional object existing above a datum plane.

In this case, the present invention is also applicable to a case in which a three-dimensional object, such as a preceding vehicle, existing above the datum plane (road surface) is detected, and the above-described advantages of the present invention can be achieved reliably.

Preferably, the stereo matching means and the selection means operate by using distances and representative distances uniquely correlated to the parallaxes and the representative parallaxes according to the principle of triangulation, instead of the parallaxes and the representative parallaxes.

The parallax and the representative parallax can be uniquely correlated to a distance and a representative distance according to the principle of triangulation. Therefore, the operation can be performed using the distance and the representative distance instead of the parallax and the representative parallax. In this case, the above-described advantages of the present invention are also achieved reliably.

DESCRIPTION OF THE PREFERRED EMBODIMENTS

An environment recognition system according to an embodiment of the present invention will be described below with reference to the drawings.

The following description will be given of a case in which the environment recognition system is mounted in a vehicle so as to detect a preceding vehicle. However, an object to be detected is not limited to the preceding vehicle, and other vehicles, pedestrians, obstacles, or all of them can be detected. Further, the environment recognition system is not mounted only in the vehicle, and may be mounted in other moving bodies such as an automotive robot, or may be used as a stationary monitoring apparatus.

Figure 1:
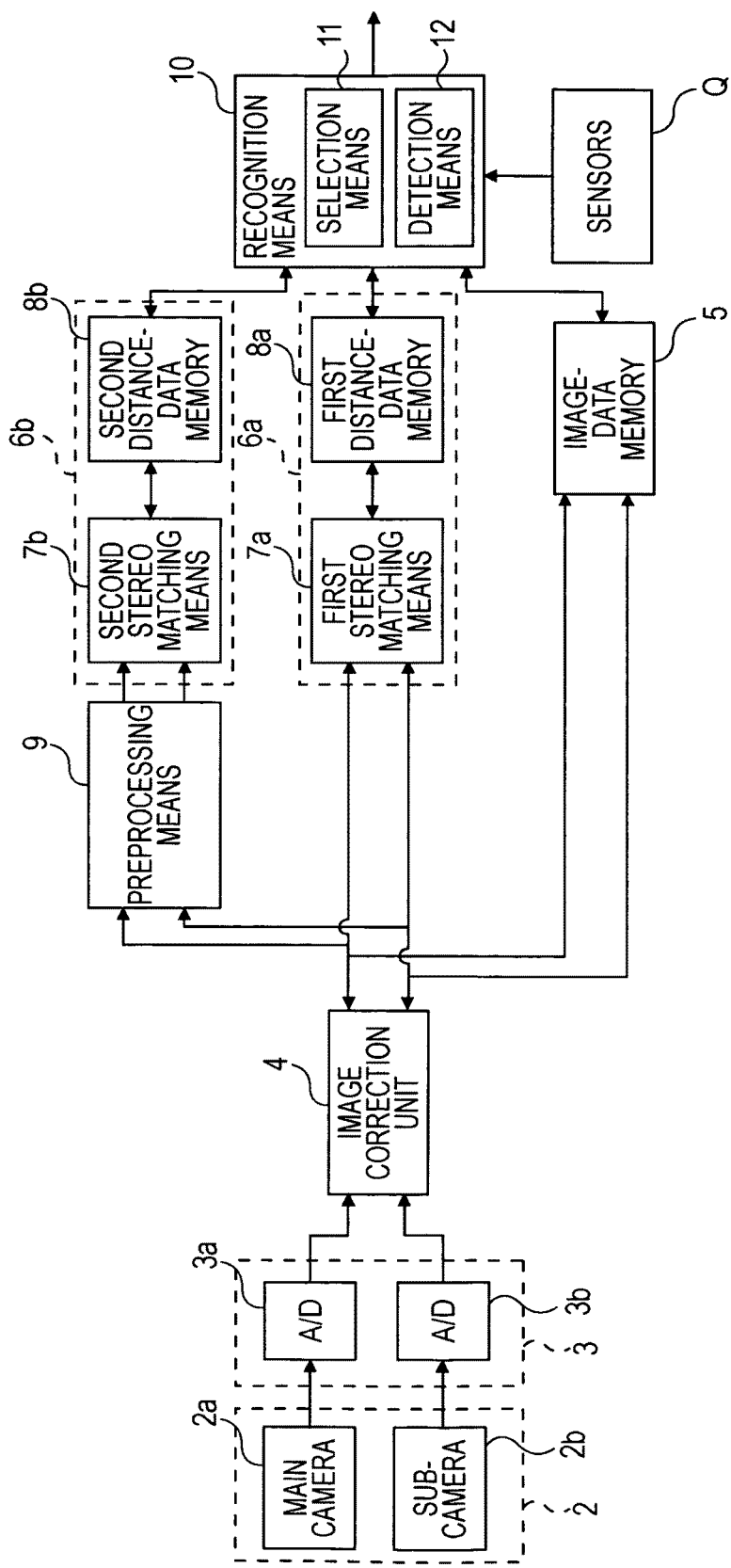
FIG. 1 is a block diagram showing a configuration of an environment recognition system according to an embodiment.

Referring to FIG. 1, an environment recognition system 1 according to the embodiment includes an image taking means 2, a conversion means 3, and a recognition means 10 including a selection means 11 and a detection means 12. The environment recognition system 1 also includes two image processing means 6a and 6b.

The configuration including the image taking means 2, the conversion means 3, an image correction unit 4, an image-data memory 5, and the first and second image processing means 6a and 6b respectively having first and second stereo matching means 7a and 7b and first and second distance-data memories 8a and 8b has been described in detail in the above-described publications and Japanese Unexamined Patent Application Publication Nos. 5-114099, 5-265547, 6-266828, and 2006-72495 filed earlier by the present applicant. Therefore, the configuration will be briefly described below.

In this embodiment, the image taking means 2 is formed by a stereo camera including a main camera 2a and a sub-camera 2b mounted on an vehicle-interior side of the front glass. The main camera 2a and the sub-camera 2b are spaced a predetermined distance apart in the vehicle width direction, that is, in the right-left direction. The main camera 2a and the sub-camera 2b respectively include image sensors, such as CCDs or CMOS sensors, which are in synchronization with each other.

Figure 2:
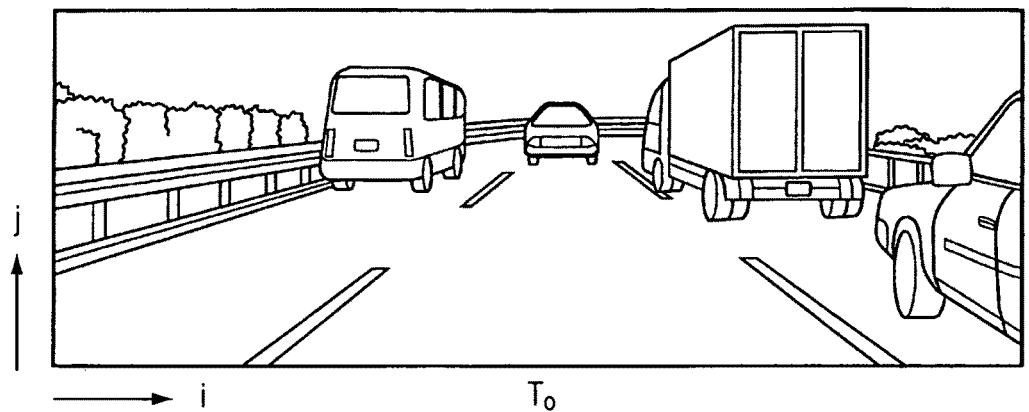
FIG. 2 shows an example of a reference image.

The main camera 2a and the sub-camera 2b are mounted at the same height from the road surface, simultaneously take images of an environment around the subject vehicle at a predetermined sampling cycle, and output information about the taken images. The main camera 2a close to the driver outputs image data on a reference image $T_0$ illustrated in FIG. 2, and the sub-camera 2b remote from the driver outputs image data on a comparative image $T_c$ that is not shown. In this embodiment, the reference image $T_0$ and the comparative image $T_c$ serve as a pair of images.

Image data output from the main camera 2a and the sub-camera 2b is converted from analog images into digital images, in which each pixel has a predetermined number of levels of brightness, such as 256-level gray scale, by A/D converters 3a and 3b in the conversion means 3. The digital images are subjected to image correction, such as displacement and noise removal, by the image correction unit 4. After image correction, the image data is stored in the image-data memory 5, and is also transmitted to the first image processing means 6a and the second image processing means 6b.

The first image processing means 6a includes the first stereo matching means 7a, such as an image processor, and the first distance-data memory 8a.

In this embodiment, the first image processing means 6a directly conducts stereo matching on the reference image $T_0$ and the comparative image $T_c$ without preprocessing. However, the first image processing means 6a can conduct stereo matching on two images formed by preprocessing the reference image $T_0$ and the comparative image $T_c$, similarly to the second image processing means 6b that will be described below. In this case, a pair of images preprocessed by a certain method are input to the first image processing means 6a, and another pair of images preprocessed by a different method are input to the second image processing means 6b.

Figure 17:
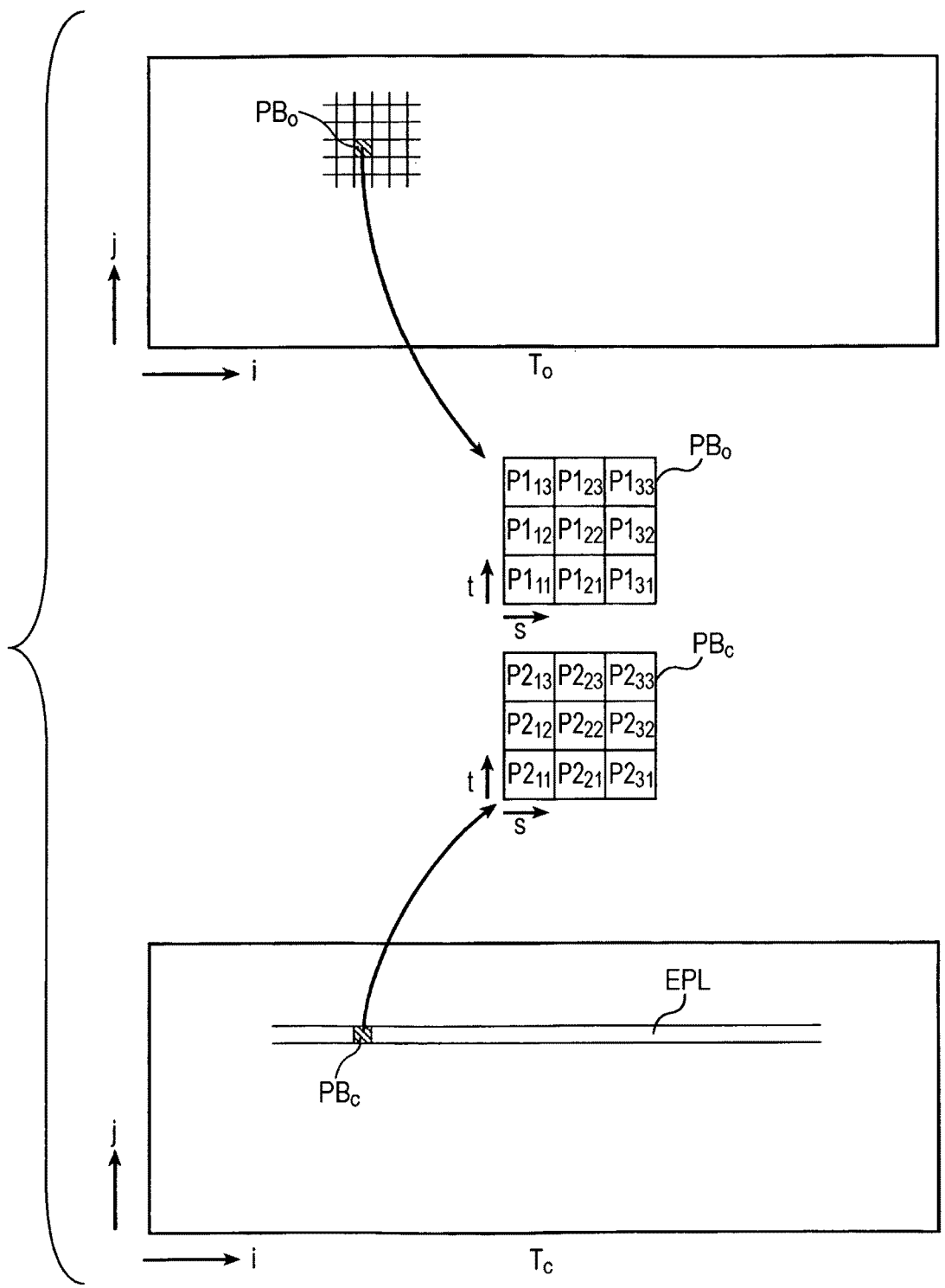
FIG. 17 illustrates how to perform stereo matching.

The first stereo matching means 7a performs stereo matching by the method shown in FIG. 17. That is, the first stereo matching means 7a sets a reference pixel block $PB_0$ defined by a predetermined number of pixels, such as 3 by 3 pixels or 4 by 4 pixels, in a reference image $T_0$, sets an epipolar line EPL at a vertical position in a comparative image $T_c$ corresponding to the reference pixel block $PB_0$, and searches for comparative pixel blocks $PB_c$ in the comparative image $T_c$ while shifting the comparative pixel blocks $PB_c$ on the epipolar line EPL one pixel by one pixel, for example, from left to right. Then, the first stereo matching means 7a calculates SAD values according to Expression (1) described above, and specifies a comparative pixel block $PB_c$ whose SAD value is less than or equal to a threshold value and is the smallest.

While the SAD value is thus used in this embodiment, for example, stereo matching can be performed on the basis of the sum of squares of the difference between a brightness $p1st$ of the pixel in the reference pixel block $PB_0$ and a brightness $p2st$ of the pixel in the comparative pixel block $PB_c$. Alternatively, stereo matching can be performed on the basis of difference calculated according to other expressions as long as the difference in the brightness pattern between the reference pixel block $PB_0$ and the comparative pixel block $PB_c$ can be calculated properly.

The first stereo matching means 7a also calculates a first parallax dp1 from the position of an original reference pixel block $PB_0$ in the reference image $T_0$ and the position of the corresponding comparative pixel block $PB_c$ specified in the comparative image $T_c$ by stereo matching. The above-described operations are performed for all reference pixel blocks $PB_0$ in the reference image $T_0$, and a first parallax dp1 is calculated for each reference pixel block $PB_0$.

Figure 3:
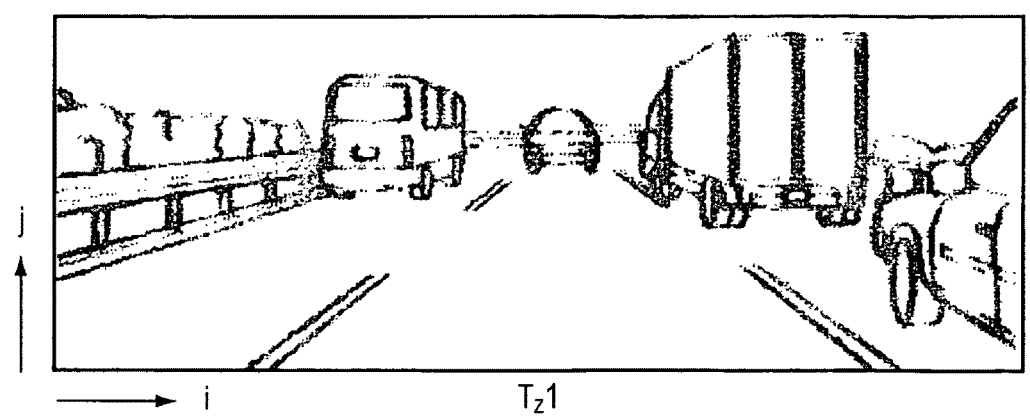
FIG. 3 shows a first distance image formed on the basis of the reference image shown in FIG. 2.

By assigning the calculated effective first parallaxes dp1 to the reference pixel blocks $PB_0$ in the reference image $T_0$, a first distance image $T_z1$ is formed, as shown in FIG. 3. In this way, the first stereo matching means 7a calculates the first parallaxes dp1 by stereo matching, and forms the first distance image $T_z1$.

A point $(X_1, Y_1, Z_1)$ in real space, the first parallax dp1, and a point $(i_1, j_1)$ in the first distance image $T_z1$ can be uniquely correlated by coordinate conversion given by the following Expressions (2) to (4) according to the principle of triangulation:

$$X_1 = CD/2 + Z_1 \times PW \times (i_1 - IV) \quad (2)$$

$$Y_1 = CH + Z_1 \times PW \times (j_1 - JV) \quad (3)$$

$$Z_1 = CD/(PW \times (dp1 - DP)) \quad (4)$$

where a point on the road surface just below the midpoint between the main camera 2a and the sub-camera 2b is designated as the origin, the X-axis indicates the width direction (right-left direction) of the subject vehicle, the Y-axis indicates the vehicle height direction, and the Z-axis indicates the vehicle length direction (front-rear direction).

In the above expressions, CD represents the distance between the main camera 2a and the sub-camera 2b, PW represents the viewing angle for one pixel, CH represents the mounting height of the main camera 2a and the sub-camera 2b, IV and JV respectively represent i and j coordinates in the first distance image $T_z1$ of the point at infinity in front of the subject vehicle, and DP represents the vanishing point parallax.

Since the first parallax dp1 and the first distance $Z_1$ are uniquely correlated in this way, the first stereo matching means 7a can convert calculated first parallaxes dp1 into first distances $Z_1$ according to Expression (4) described above, and can form a first distance image $T_z1$ by assigning the first distances $Z_1$ to the reference pixel blocks $PB_0$ in the reference image $T_0$.

The first stereo matching means 7a stores information about the obtained first distance image $T_z1$ in the first distance-data memory 8a.

Figure 18A:
FIG. 18A is a photograph showing an example of a reference image.
Figure 18B:
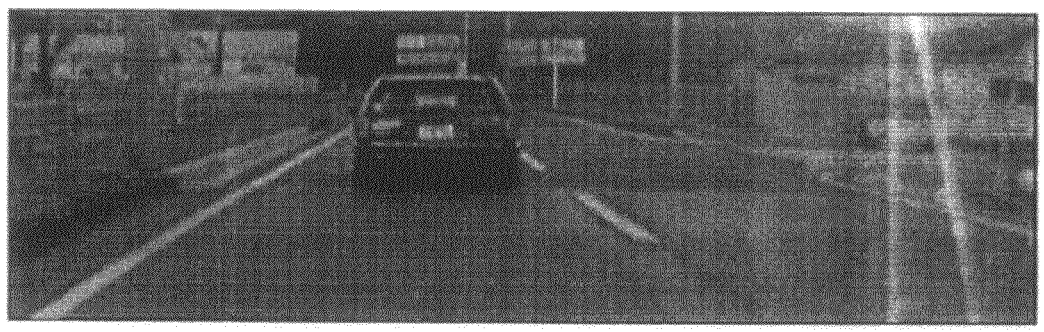
FIG. 18B is a photograph showing a comparative image that is totally darker than the reference image shown in FIG. 18A.
Figure 19:
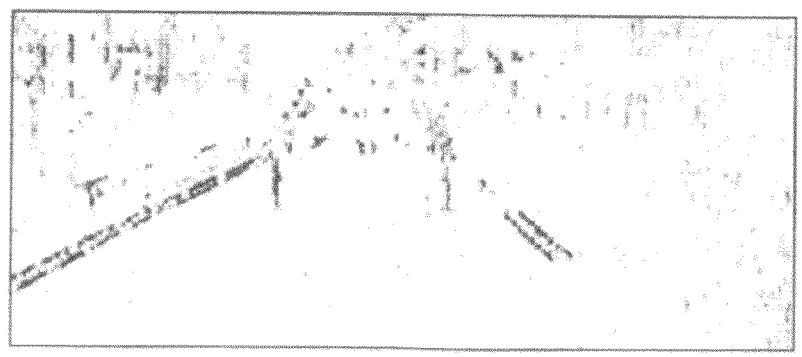
FIG. 19 is a photograph showing a distance image obtained by stereo matching of the reference image shown in FIG. 18A and the comparative image shown in FIG. 18B.

The first stereo matching means 7a forms a first distance image $T_z1$ shown in FIG. 19 in the above-described scene in which a reference image $T_0$ shown in FIG. 18A and a comparative image $T_c$ shown in FIG. 18B are taken by the main camera 2a and the sub-camera 2b.

In contrast, a pair of images formed by subjecting the reference image $T_0$ and the comparative image $T_c$ to a predetermined processing operation by a preprocessing means 9 (see FIG. 1) are input to the second image processing means 6b.

In this embodiment, the preprocessing means 9 forms a reference edge image $TE_0$ and a comparative edge image $TE_c$ by subjecting the reference image $T_0$ and the comparative image $T_c$ to edge processing as the predetermined preprocessing. That is, a reference edge image $TE_0$ is formed by calculating a difference in brightness between each pixel belonging to the reference image $T_0$ and a pixel adjacent on the left side thereof. Similarly, a comparative edge image $TE_c$ is formed from the comparative image $T_c$.

Figure 20A:
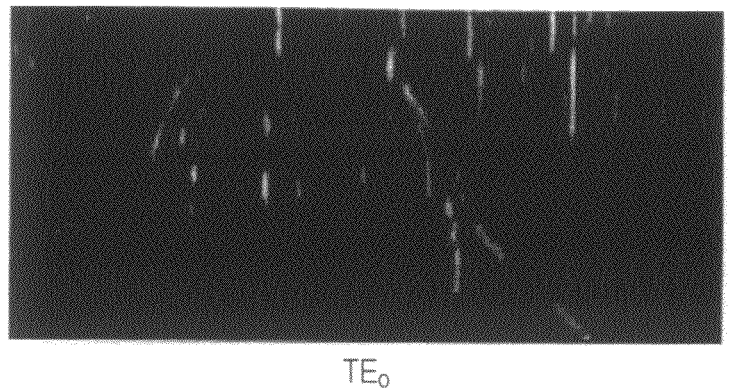
FIG. 20A is a photograph showing a reference edge image obtained by subjecting the reference image shown in FIG. 18A to edge processing.
Figure 20B:
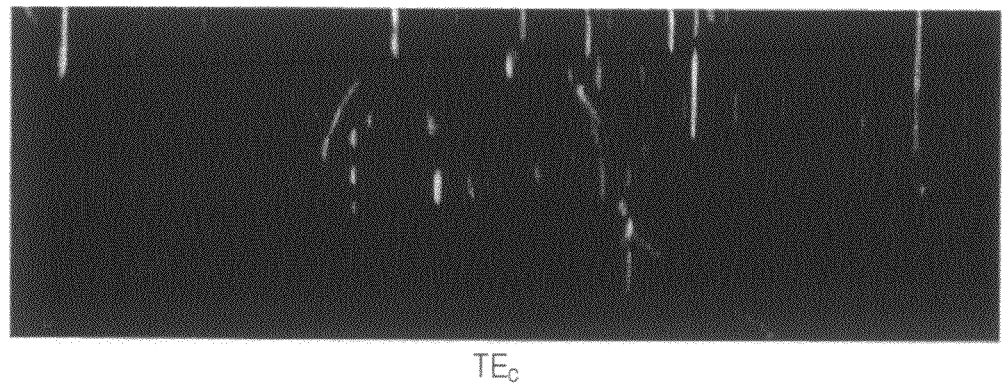
FIG. 20B is a photograph showing a comparative edge image obtained by subjecting the comparative image shown in FIG. 18B to edge processing.

For example, when edge processing is conducted on a reference image $T_0$ shown in FIG. 18A and a comparative image $T_c$ shown in FIG. 18B, a reference edge image $TE_0$ and a comparative edge image $TE_c$ in which the differences in brightness serve as the brightnesses of the pixels are formed, as shown in FIGS. 20A and 20B. The preprocessing means 9 forms the reference edge image $TE_0$ and the comparative edge image $TE_c$ in this way, and transmits the images to the second image processing means 6b.

The second image processing means 6b has a configuration similar to that of the above-described first image processing means 6a. The second stereo matching means 7b in the second image processing means 6b also performs stereo matching by the method shown in FIG. 17. However, the second stereo matching means 7b conducts stereo matching on the reference edge image $TE_0$ and the comparative edge image $TE_c$.

Figure 21:
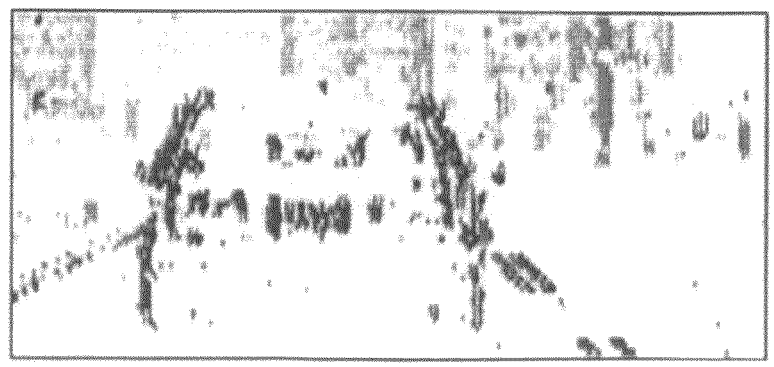
FIG. 21 is a photograph showing an edge distance image obtained by subjecting the reference edge image shown in FIG. 20A and the comparative edge image shown in FIG. 20B to stereo matching.

Similarly to the first stereo matching means 7a, the second stereo matching means 7b calculates second parallaxes dp2 for pixel blocks in the reference edge image $TE_0$, and forms a second distance image $T_z2$ (i.e., an edge distance image $TE_z$) by assigning the calculated second parallaxes dp2 to the pixel blocks in the reference edge image $TE_0$. A second distance image $T_z2$ shown in FIG. 21 is obtained from the reference edge image $TE_0$ shown in FIG. 20A and the comparative edge image $TE_c$ shown in FIG. 20B.

Since the pixel blocks in the reference edge image $TE_0$ are set at the same pixel positions as those of the pixel blocks $PB_0$ that are set in the reference image $T_0$ by the first stereo matching means 7a, it can also be said that the second distance image $T_z2$ is formed by assigning the calculated second parallaxes dp2 to the pixel blocks $PB_0$ in the reference image $T_0$.

When the origin, the X-axis direction, the Y-axis direction, and the Z-axis direction are set similarly to the above, a point $(X_2, Y_2, Z_2)$ in real space calculated from the second parallax dp2, the second parallax dp2, and a point $(i_2, j_2)$ in the second distance image $T_z2$ can be uniquely correlated by coordinate conversion given by the following Expressions (5) to (7) according to the principle of triangulation:

$$X_2 = CD/2 + Z_2 \times PW \times (i_2 - IV) \quad (5)$$

$$Y_2 = CH + Z_2 \times PW \times (j_2 - JV) \quad (6)$$

$$Z_2 = CD/(PW \times (dp2 - DP)) \quad (7)$$

where CD and so on are set similarly to the above.

Since the second parallax dp2 and the second distance $Z_2$ are uniquely correlated, the second stereo matching means 7b can convert the calculated second parallaxes dp2 into second distances $Z_2$ according to Expression (7) described above, and can form a second distance image $T_z2$ by assigning the second distances $Z_2$ to the pixel blocks $PB_0$ in the reference edge image $TE_0$ (reference image $T_0$).

The second stereo matching means 7b stores information about the obtained second distance image $T_z2$ in the second distance-data memory 8b.

In this way, a reference image $T_0$ and a comparative image $T_c$ are subjected to image correction such as digitization and noise removal, and are then input in a so-called raw state, to the first stereo matching means 7a. In contrast, a reference edge image $TE_0$ and a comparative edge image $TE_c$, which are formed by subjecting the reference image $T_0$ and the comparative image $T_c$ to image processing such as digitization, image correction, and preprocessing (edge processing), are input to the second stereo matching means 7b. Stereo matching is performed for each of a plurality of pairs of images that are formed by subjecting a pair of taken images (reference image $T_0$ and comparative image $T_c$) to different image processing operations.

As described above, a pair of images formed by subjecting the reference image $T_0$ and the comparative image $T_c$ to a preprocessing operation different from that for a pair of images to be input to the second stereo matching means 7b can be input to the first stereo matching means 7a. In this case, stereo matching is also performed for each of a plurality of pairs of images that are formed by subjecting a pair of taken images (reference image $T_0$ and comparative image $T_c$) to different image processing operations.

The recognition means 10 (see FIG. 1) is formed by a microcomputer in which a CPU, a ROM, a RAM, an input/output interface, etc. (not shown) are connected to a bus. Further, sensors Q, such as a vehicle-speed sensor, a yaw-rate sensor, and a steering-angle sensor for measuring the steering angle of the steering wheel, are connected to the recognition means 10. The yaw-rate sensor can be replaced with a device that estimates the yaw rate, for example, from the vehicle speed of the subject vehicle.

The recognition means 10 includes a selection means 11, a detection means 12, and a memory (not shown).

Figure 4:
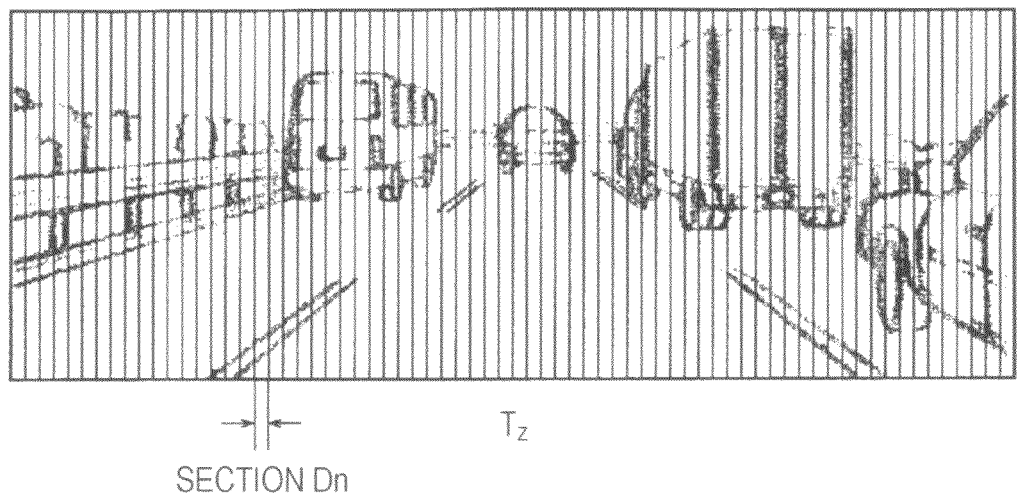
FIG. 4 illustrates strip sections of the first distance image.
Figure 5:
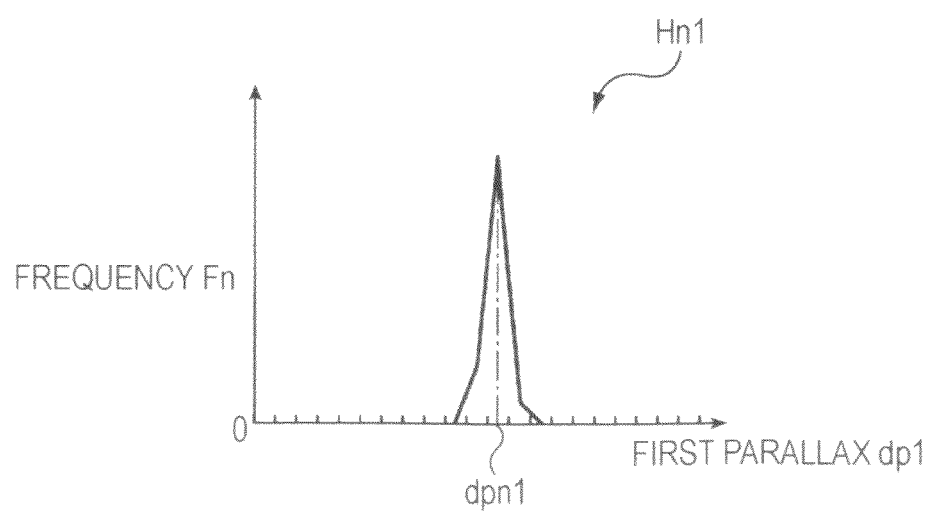
FIG. 5 illustrates a first histogram formed for each of the sections shown in FIG. 4.

The selection means 11 reads out a first distance image $T_z1$ from the first distance-data memory 8a, and divides the first distance image $T_z1$ into vertical strip sections Dn each having a predetermined pixel width, as shown in FIG. 4. Then, the selection means 11 forms a first histogram Hn1 for each strip section Dn, as shown in FIG. 5, and enters first parallaxes dp1 belonging to the section Dn into the histogram Hn1 of the section Dn. A class having the highest frequency Fn, that is, the mode is determined as a first representative parallax dpn1 of the section Dn.

In a case in which a first parallaxes dp1 is entered into the first histogram Hn1, when a height $Y_1$ calculated corresponding to the first parallax dp1 from the first parallax dp1 and the position $(i_1, j_1)$ in the first distance image $T_z1$ of a pixel block $PB_0$, to which the first parallax dpn1 is assigned, according to Expression (3) described above is less than or equal to the height of the road surface, the first parallax dpn1 is not entered. This also applies to the following entry of second parallaxes dp2 to a second histogram Hn2.

Further, the selection means 11 reads out a second distance image $T_z2$ from the second distance-data memory 8b, and divides the second distance image $T_z2$ into vertical strip sections Dn, similarly to the method shown in FIG. 4. In this case, the positions and pixel width of the sections Dn of the second distance image $T_z2$ are the same as those adopted in the first distance image $T_z1$. Then, the selection means 11 forms a second histogram Hn2 for each strip section Dn, similarly to FIG. 5, and enters second parallaxes dp2 belonging to the section Dn into the second histogram Hn2 of the section Dn. The mode of the second histogram Hn2 is determined as a second representative parallax dpn2 of the section Dn.

Figure 6:
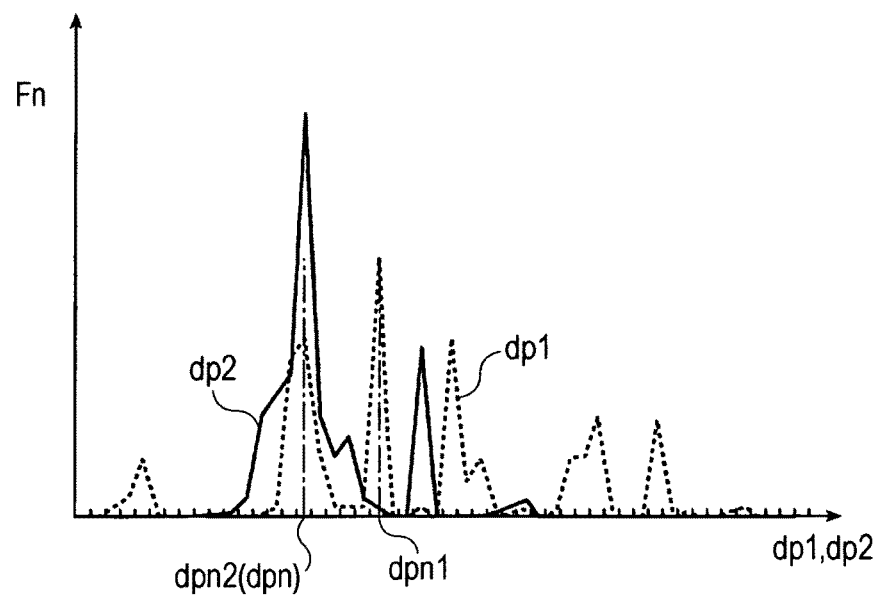
FIG. 6 illustrates a histogram indicating frequency distributions of first and second distance images.

Subsequently, the selection means 11 compares frequency distributions of the first histogram Hn1 and the second histogram Hn2 of the corresponding sections Dn, that is, sections having the same number n, in the first distance image $T_z1$ and the second distance image $T_z2$. For example, the frequency distributions of the first histogram Hn1 and the second histogram Hn2 are combined into one histogram, as shown in FIG. 6.

The selection means 11 selects, as a representative parallax dpn of the section, the higher one of the first frequency Fn of the first representative parallax dpn1 and the frequency Fn of the second representative parallax dpn2 in the section Dn. For example, since the frequency Fn of the second representative parallax dpn2 is higher than that of the first representative parallax dpn1 in the example shown in FIG. 6, the second representative parallax dpn2 is selected as a representative parallax dpn of the section Dn.

The selection means 11 performs the above-described selection of the representative parallax dpn for each section Dn. Therefore, on frequent occasions, while the second representative parallax dpn2 is selected as the representative parallax dpn in a certain section Dn, as described above, the first representative parallax dpn1 is selected as the representative parallax dpn in a different section Dn.

When the selection means 11 selects the first representative parallax dpn1 as the representative parallax dpn of the section, it sets a flag F at 0 in the section. When the selection means 11 selects the second representative parallax dpn2 as the representative parallax dpn of the section, it sets a flag F at 1 in the section.

The selection means 11 stores, in the memory, flags F thus set for the sections Dn, the results of entry in the first and second histograms Hn1 and Hn2 of the sections Dn, the first and second representative parallaxes dpn1 and dpn2, the representative parallaxes dpn of the sections Dn, and the pixel widths of the sections Dn.

As described above, in this embodiment, frequency distributions of the first histogram Hn1 and the second histogram Hn2 of the corresponding section Dn in the first distance image $T_z1$ and the second distance image $T_z2$ are compared, and one of the first representative parallax dpn1 and the second representative parallax dp2 having the higher frequency Fn is selected as a representative parallax dpn of the section Dn. On this criterion, it is possible to select one of the first representative parallax dpn1 and the second representative parallax dpn2 as the representative parallax dpn of the section Dn immediately after the first parallaxes dp1 of the first distance image $T_z1$ and the second parallaxes dp2 of the second distance image $T_z2$ are entered in the first histogram Hn1 and the second histogram Hn2. This increases the selection speed, and simplifies and clarifies the control configuration.

Alternatively, the representative parallax dpn of each section Dn can be selected on other criteria.

For example, the frequency distributions of first and second histograms Hn1 and Hn2 corresponding to a section Dn can be compared, and one of a first representative parallax dpn1 and a second representative parallax dpn2 that provides the smaller variance $\sigma^2$ in the histogram can be selected as a representative parallax dpn of the section Dn. On this criterion, the representative parallax is selected on the basis of the frequency distribution in which the dispersion $\sigma^2$ smaller and which shows smaller variations. Therefore, a distance image $T_z$ including less noise is selected. Consequently, erroneous detection due to noise is reduced, and more accurate detection can be achieved.

Alternatively, the larger one of a first representative parallax dpn1 and a second representative parallax dpn2 can be selected as a representative parallax dpn of the section Dn. By substituting the first representative parallax dpn1 and the second representative parallax dpn2 into Expressions (4) and (7) described above, a first distance $Z_1$ and a second distance $Z_2$ are calculated as the distance from the subject vehicle to an object (preceding vehicle). The first distance $Z_1$ and the second distance $Z_2$ decrease as the first representative parallax dpn1 and the second representative parallax dpn2 increase. If a distance larger than the actual distance from the subject vehicle to the object is calculated and automatic control is performed on the basis of the calculated distance, the risk at which the subject vehicle will contact or collide with the object (preceding vehicle) increases.

For this reason, on the above-described criterion, since the larger one of the first representative parallax dpn1 and the second representative parallax dpn2 is selected as the representative parallax dpn of the section Dn, the smaller one of the first distance $Z_1$ and the second distance $Z_2$ that is calculated from the representative parallax is selected. Hence, even when automatic control is performed on the basis of the selected distance, the risk at which the subject vehicle will contact or collide with the object (preceding vehicle) decreases, and detection can be performed with more emphasis on safety.

Figure 7:
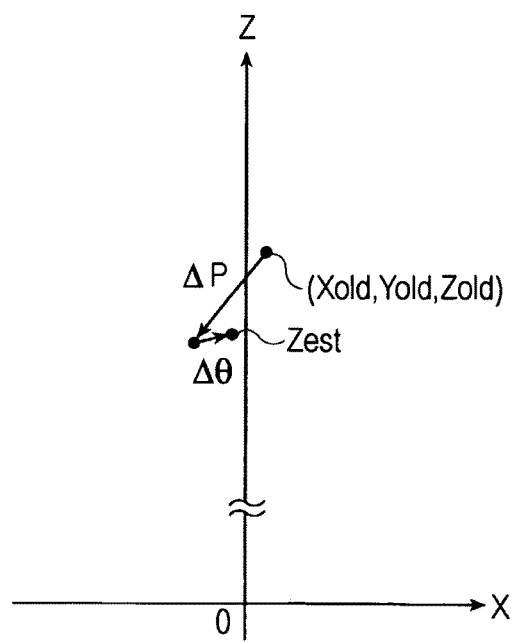
FIG. 7 illustrates a distance to a preceding vehicle in the current sampling period that is estimated from the center position of a back surface of the preceding vehicle detected in the previous sampling period.

While the detection means 12, which will be described below, detects the preceding vehicle in real space, as shown in FIG. 7, a distance Zest to the preceding vehicle in the current sampling period can be estimated from the center position (Xold, Yold, Zold) in real space of the rear surface of the preceding vehicle, the relative displacement ΔP between the preceding vehicle and the subject vehicle, and the displacement Δθ of the subject vehicle due to yawing, which are detected in the previous sampling period.

Accordingly, one of the first distance $Z_1$ and the second distance $Z_2$ that is closer to the estimated distance Zest of the preceding vehicle in the current sampling period can be selected, and one of the first representative parallax dpn1 and the second representative parallax dpn2 that provides the selected distance can be selected as the representative parallax of the section Dn. On this criterion, the object (preceding vehicle in this case) can be detected stably.

While the above criteria can be independently applied, they may be applied in combination. For example, particularly at night, much data on second parallaxes dp2 based on noise components are calculated in the second distance image $T_z2$ that is obtained from the reference edge image $TE_O$ and the comparative edge image $TE_c$. Hence, the criterion can be switched as follows. For example, in the daytime, one of the first representative parallax dpn1 and the second representative parallax dpn2 having the higher frequency Fn can be selected as the representative parallax dpn of the section Dn, as in this embodiment. On the other hand, when the headlights of the subject vehicle are lit at night, one of the first representative parallax dpn1 and the second representative parallax dpn2 in which the variance $\sigma^2$ of the frequency distribution is smaller can be selected.

The detection means 12 (see FIG. 1) detects objects in the reference image $T_O$ on the basis of the representative parallaxes dpn respectively selected for the sections Dn by the selection means 11, and further detects a preceding vehicle from the objects.

Figure 8:
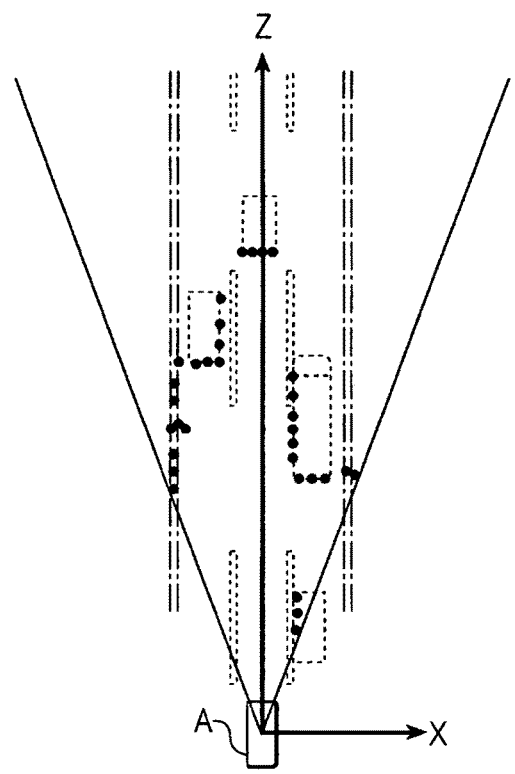
FIG. 8 shows dots formed by plotting distances in the sections into real space.

More specifically, while checking the values of the flags F respectively set for the sections Dn by the selection means 11, the detection means 12 reads out, from the memory, one of the first representative parallax dpn1 and the second representative parallax dpn2 corresponding to the value of the flag F as a representative parallax dpn of the section Dn. Further, the detection means 12 calculates a first distance $Z_1$ or a second distance $Z_2$ by substituting the parallax dpn of the section Dn into dp1 in Expression (4) or dp2 in Expression (7) described above, and plots the calculated distance as a typical distance Zn of the section Dn in real space, as shown in FIG. 8.

Figure 9:
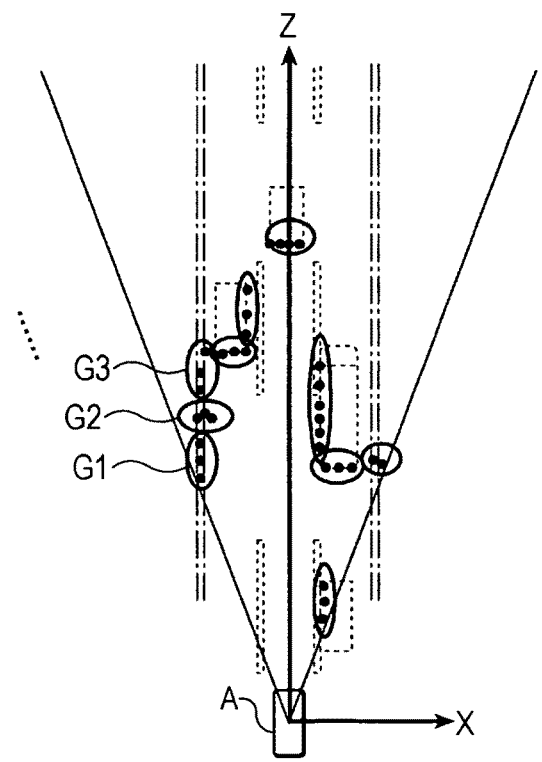
FIG. 9 shows groups obtained from the dots shown in FIG. 8.

Then, the detection means 12 combines the adjacent dots into groups G1, G2, G3, . . . on the basis of the distances and directionality of the dots indicating the plotted typical distances Zn of the sections Dn, as shown in FIG. 9.

As described above, when first parallaxes dp1 and second parallaxes dp2 are entered into the first histogram Hn1 and the second histogram Hn2, first parallaxes dp1 and second parallaxes dpn2 at heights less than or equal to the height of the road surface are removed. Therefore, the above-described detected objects exist above the road surface serving as the datum plane.

Figure 10:
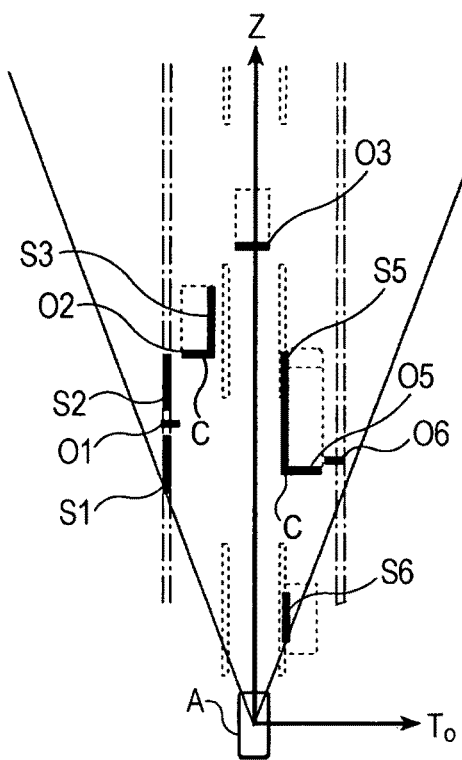
FIG. 10 shows examples of objects detected by linear approximation of the dots in the groups shown in FIG. 9.

For this reason, the detection means 12 linearly approximates the dots in each group, as shown in FIG. 10. The detection means 12 labels a group, in which the dots are arranged substantially parallel to the width direction of the subject vehicle A, that is, the X-axis direction, with an "object" O, and labels a group, in which the dots are arranged substantially parallel to the length direction of the subject vehicle A, that is, the Z-axis direction, with a "side wall" S, thus detecting three-dimensional objects. A point that can be regarded as an intersection of an "object" group and a "side wall" group of the same object is labeled with C as a corner point.

In the example shown in FIG. 10, the detection means 12 detects, as one three-dimensional object, each of [Side Wall S1], [Object O1], [Side Wall S2], [Object O2, Corner Point C, Side Wall S3], [Side Wall S4], [Object O3], [Object O4], [Side Wall S5, Corner Point C, Object O5], [Object O6], and [Side Wall S6].

Figure 11:
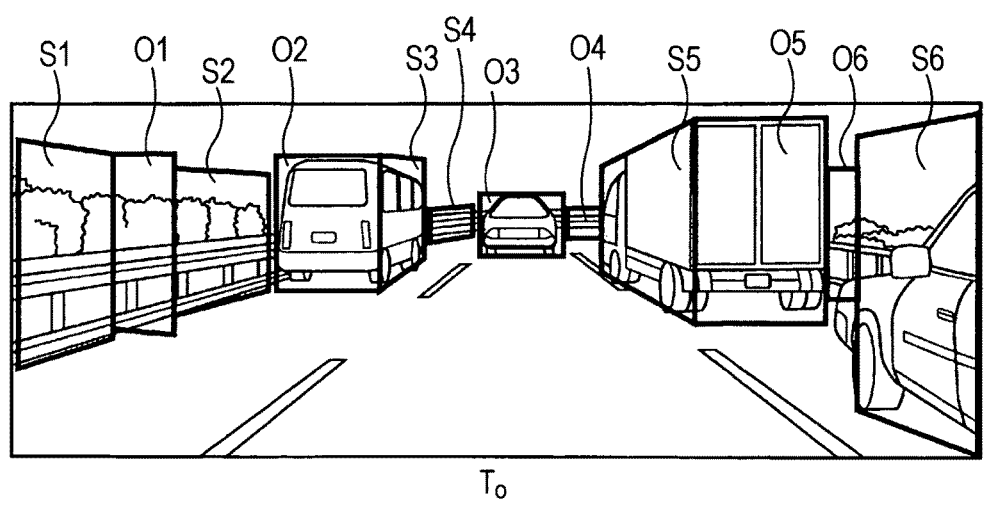
FIG. 11 shows detected objects enclosed by frames in a reference image.

The detection means 12 encloses the detected objects in rectangular frames in the reference image $T_O$, as shown in FIG. 11. In this way, the detection means 12 detects objects in the reference image $T_O$, and recognizes the environment around the subject vehicle A.

The detection means 12 further detects a preceding vehicle from the detected objects.

Figure 12:
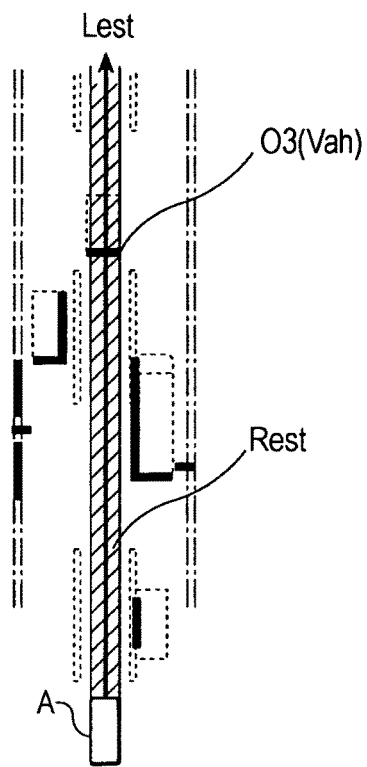
FIG. 12 shows a traveling locus and a traveling path of a subject vehicle and a preceding vehicle in real space.

More specifically, the detection means 12 first estimates, as a traveling locus Lest, a locus that the subject vehicle A will form during future driving, on the basis of the behavior of the subject vehicle A, as shown in FIG. 12. Then, the detection means 12 calculates, as a traveling path Rest of the subject vehicle A, a region that has a width equal to the width of the subject vehicle A and that includes the traveling locus Lest at the center thereof.

The traveling locus Lest of the subject vehicle A can be calculated from the turning curvature Cua of the subject vehicle A. The turning curvature Cua is calculated according to the following Expression (8) or the following Expressions (9) and (10) on the basis of information transmitted from the sensors Q, for example, the vehicle speed V and the yaw rate γ of the subject vehicle A, and the steering angle δ of the steering wheel:

$$Cua = \gamma/V \tag{8}$$

$$Re = (1 + Asf \cdot V^2) \cdot (Lwb/\delta) \tag{9}$$

$$Cua = 1/Re \tag{10}$$

where Re represents the turning radius, Asf represents the stability factor of the vehicle, and Lwb represents the wheel base.

Figure 13:
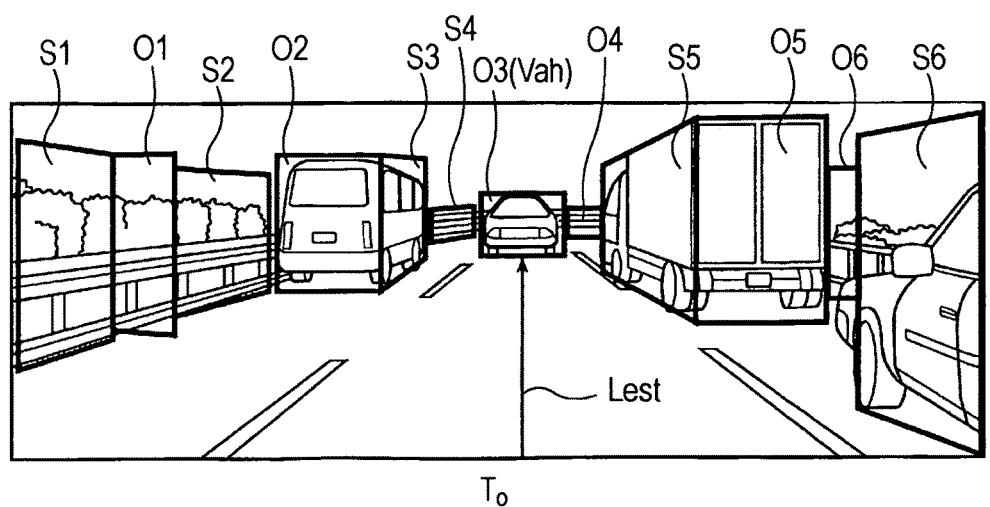
FIG. 13 shows the traveling locus of the subject vehicle and the preceding vehicle in the reference image.

The detection means 12 detects, as a preceding vehicle Vah traveling in front of the subject vehicle A, an object closest to the subject vehicle A, of the objects existing on the traveling path Rest of the subject vehicle A. For example, in a scene shown in FIG. 11, a vehicle O3 is detected as a preceding vehicle Vah, as shown in FIG. 13.

The detection means 12 pursues the preceding vehicle Vah with consistency, for example, by calculating the probability that a preceding vehicle detected in the previous sampling period and an object (three-dimensional object) detected in the current sampling period are the same three-dimensional object. Further, the detection means 12 can detect the exchange between preceding vehicles, for example, when a detected preceding vehicle comes out of the front of the subject vehicle and a vehicle in front of the detected preceding vehicle becomes a new preceding vehicle, or when another vehicle cuts in between the subject vehicle and the preceding vehicle so as to become a new preceding vehicle.

The detection means 12 stores information about the detected objects and preceding vehicle Vah in the memory, and outputs the information from the environment recognition system 1 together with information about the flags F set for the sections Dn that is stored in the memory by the selection means 11, as necessary.

Operation of the environment recognition system 1 according to this embodiment will now be described.

The selection means 11 in the recognition means 10 divides the first distance image $T_z1$ and the second distance image $T_z2$ formed as described above into strip sections Dn having the same predetermined pixel width, forms a first histogram Hn1 for each section Dn of the first distance image $T_z1$, and forms a second histogram Hn2 for each section Dn of the second distance image $T_z2$. Then, the selection means 11 respectively enters first and second parallaxes dp1 and dp2 belonging to the sections Dn into the first and second histograms Hn1 and Hn2.

Immediately after the entry into each sections Dn is completed, the modes of the first and second histograms Hn1 and Hn2 are determined, and a first representative parallax dpn1 and a second representative parallax dpn2 are calculated. The frequencies Fn of the first representative parallax dpn1 and the second representative parallax dpn2 are compared, and one of the parallaxes whose frequency is higher is selected as a representative parallax dpn of the section Dn. This operation is performed for all sections Dn, and a representative parallax dpn is calculated for each section Dn.

In this way, the selection means 11 selects one of a first representative parallax dpn1 and a second representative parallax dpn2, which satisfies the above-described set criteria and satisfies the condition more, for each section Dn. For this reason, as the representative parallax dpn of the section Dn, only the superior one of the representative parallaxes dpn1 and dpn2 of the section Dn is extracted.

In this embodiment, the first distance image $T_z1$ formed on the basis of the reference image $T_0$ and the comparative image $T_c$ is compared with the second distance image $T_z2$ formed on the basis of the reference edge image $TE_0$ and the comparative edge image $TE_c$, and a superior representative parallax is selected as a representative parallax dpn of each section Dn. Hence, for example, in a case in which the brightness balance between the main camera 2*a* and the sub-camera 2*b* is disturbed, as shown in FIGS. 18A and 18B and in which the first distance image $T_z1$ includes a section Dn in which the number of data on effective first parallaxes dp1 is small, when the frequency Fn of the second representative parallax dpn2 in the corresponding section Dn in the second distance image $T_z2$ is high, the second representative parallax dpn2 is selected. This allows the detection means 12 to effectively and accurately detect objects.

Even in a case in which much noise is included in a certain section Dn of the second distance image $T_z2$ formed on the basis of the reference edge image $TE_0$ and the comparative edge image $TE_c$, the second parallaxes dp2 are widely distributed, and the peak cannot be clearly obtained in the second histogram Hn2, when the detected first parallaxes dp1 concentrate in the same class in the first histogram Hn1 of the first distance image $T_z1$ formed on the basis of the reference image $T_0$ and the comparative image $T_c$ and the frequency Fn of the first representative parallax dpn1 is higher than that of the second representative parallax dpn2, the first representative parallax dpn1 is selected. Thus, even in such a situation, the detection means 12 can effectively and accurately detect objects on the basis of the selected superior representative parallax.

As described above, according to the environment recognition system 1 of this embodiment, stereo matching is conducted on each of a plurality of pairs of images formed by subjecting taken reference and comparative images $T_0$ and $T_c$ to different image processing operations, for example, a combination of the reference image $T_0$ and the comparative image $T_c$ serving as raw data, and a combination of a reference edge image $TE_0$ and a comparative edge image $TE_c$ subjected to edge processing, thereby obtaining a first distance image $T_z1$ and a second distance image $T_z2$. Each of the first distance image $T_z1$ and the second distance image $T_z2$ is divided into a plurality of sections Dn. In each section Dn, a representative parallax dpn1 or a representative parallax dpn2 that satisfies the condition more is selected as a representative parallax dpn of the section Dn.

For this reason, only the superior one of the representative parallaxes based on the first distance image $T_z1$ and the second distance image $T_z2$ can be extracted as a representative parallax dpn of each section Dn. For example, in a situation in which it is difficult to extract a representative parallax dpn in a certain section Dn of the distance image $T_z$ by using only one of the pairs of images, it is possible to compensate for extraction by data on the other pair of images corresponding to the section Dn.

In this way, in the environment recognition system 1 of this embodiment, the representative parallax dpn of each section Dn can be reliably extracted by selecting the superior one of the representative parallaxes. On the basis of the extracted data, objects and the preceding vehicle Vah can be effectively detected, and the surrounding environment can be recognized.

First Modification

In the above-described embodiment, two image processing means, namely, the image processing means 6a and 6b are provided, and a pair of taken images (reference image $T_0$ and comparative image $T_c$) are subjected to different image processing operations so as to form two pairs of images, that is, a combination of a reference image $T_0$ and a comparative image $T_c$ serving as raw data, and a combination of a reference edge image $TE_0$ and a comparative edge image $TE_c$. Alternatively, three or more pairs of images can be formed by performing different image processing operations.

In this case, since the number of choices is further increased when selecting the representative parallax dpn of each section Dn, a representative parallax that satisfies the condition more can be extracted, and the above-described advantage can be achieved more effectively.

Second Modification

In the above-described embodiment, as pairs of images obtained by processing the reference image $T_0$ and the comparative image $T_c$ in different manners, a combination of a reference image $T_0$ and a rare comparative image $T_c$ serving as raw data, which are subjected to only image correction such as noise removal, and a combination of a reference edge image $TE_0$ and a comparative edge image $TE_c$ which are subjected to edge processing are used.

However, in view of the essential matter of the present invention in that a superior representative parallax is selected for the corresponding sections Dn in a distance image based on one pair of images and a distance image based on the other pair of images, a plurality of pairs of images different from the above-described two pairs of images can be formed by subjecting a pair of taken images to different image processing operations.

Figure 14:
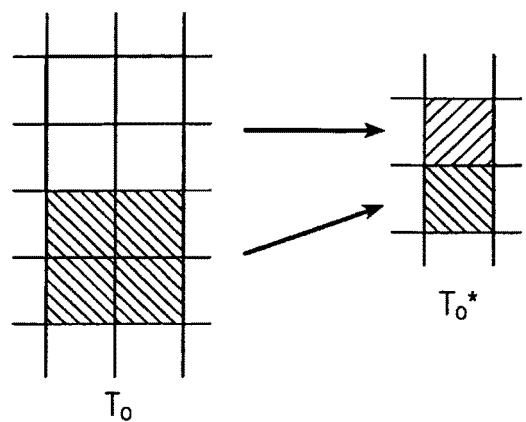
FIG. 14 illustrates how to form an image having a different resolution from the reference image.

In some cases, brightnesses p1$ij$ of pixels in the reference image $T_0$ taken by the main camera 2a are averaged by each unit of two by two pixels, and an image $T_0$* having a different resolution is formed for automatic vehicle control on the basis of the original reference image $T_0$ so that the above average brightness serves as a brightness of one pixel in the image $T_0$*, as shown in FIG. 14. In this way, it is possible to use pairs of images formed by changing the resolutions of the reference image $T_0$ and the comparative image $T_c$.

Third Modification

Figure 15:
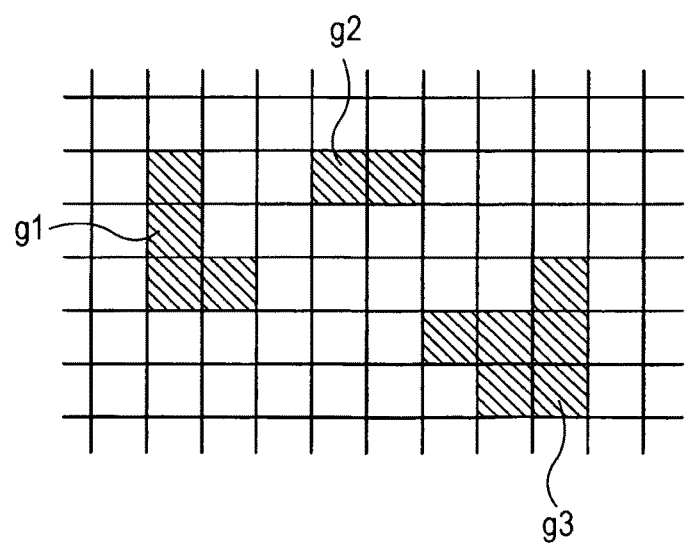
FIG. 15 shows information about groups of parallaxes in the distance image.

As disclosed in Japanese Unexamined Patent Application Publication No. 10-285582 filed earlier by the present applicant, in order to efficiently remove noise from the distance image, for example, when a difference between data on adjacent parallaxes dp in the distance image is ±1 pixel, the data on the parallaxes dp are combined into groups g1 to g3, as shown in FIG. 15. The groups g1 and g3 in which the number of data on the parallaxes dp belonging to the same group g is more than or equal to a preset threshold value are adopted as effective data, and the group g2 in which the number is less than the threshold value is rejected. This method is also adopted in the above embodiment.

Accordingly, as a plurality of pairs of images formed by subjecting the taken pair of images to different image processing operations, two pairs of images that are different in the threshold value for noise removal during formation of the distance image can be used.

Fourth Modification

As a plurality of pairs of images formed by subjecting a pair of taken images to different image processing operations, it is possible to use two pairs, that is, a combination of original reference and comparative images $T_0$ and $T_c$ which are taken by the main camera 2a and the sub-camera 2b and whose brightnesses are not changed, and a pair of images formed by changing the image brightnesses of the reference image $T_0$ and the comparative image $T_c$ by the image correction unit 4 or the preprocessing means 9.

Further, two pairs of images formed by changing the brightnesses of the reference image $T_0$ and the comparative image $T_c$ taken by the main camera 2a and the sub-camera 2 can be used. By selecting the superior one of the representative parallaxes calculated on the basis of the two pairs of images thus formed, an advantage similar to the above can be obtained.

Fifth Modification

Distance images can be formed on the basis of the same pair of images, and can be divided into vertical sections, as shown in FIG. 4. However, the width of the sections is different between the distance images. For example, one of the distance images is divided into sections Dk having a predetermined pixel width, and the other distance image is divided into sections Dm having a pixel width double the pixel width of the sections Dk. Representative parallaxes are calculated for each section Dk and each section Dm in the distance images, and one of the representative parallaxes of the corresponding sections Dk and Dm is selected.

In this case, while two sections Dk in one of the distance images correspond to one section Dm in the other distance image, the number of data on the parallaxes dp belonging to the section Dk is different from that of the section Dm. Thus, it is preferable that the selection means 11 perform selection while assigning a predetermined weight to the calculated representative parallaxes of the sections Dk and Dm. This weighted selection is also appropriately performed in the other modifications.

Sixth Modification

While distance images formed on the basis of the same pair of images are divided into a plurality of sections Dn having the same pixel width, the selection means 11 can form, for each section Dn, a plurality of histograms that are different in at least one of the maximum value, the minimum value, and the class width, can calculate representative parallaxes corresponding to the histograms, and can select any of the representative parallaxes.

Figure 16:
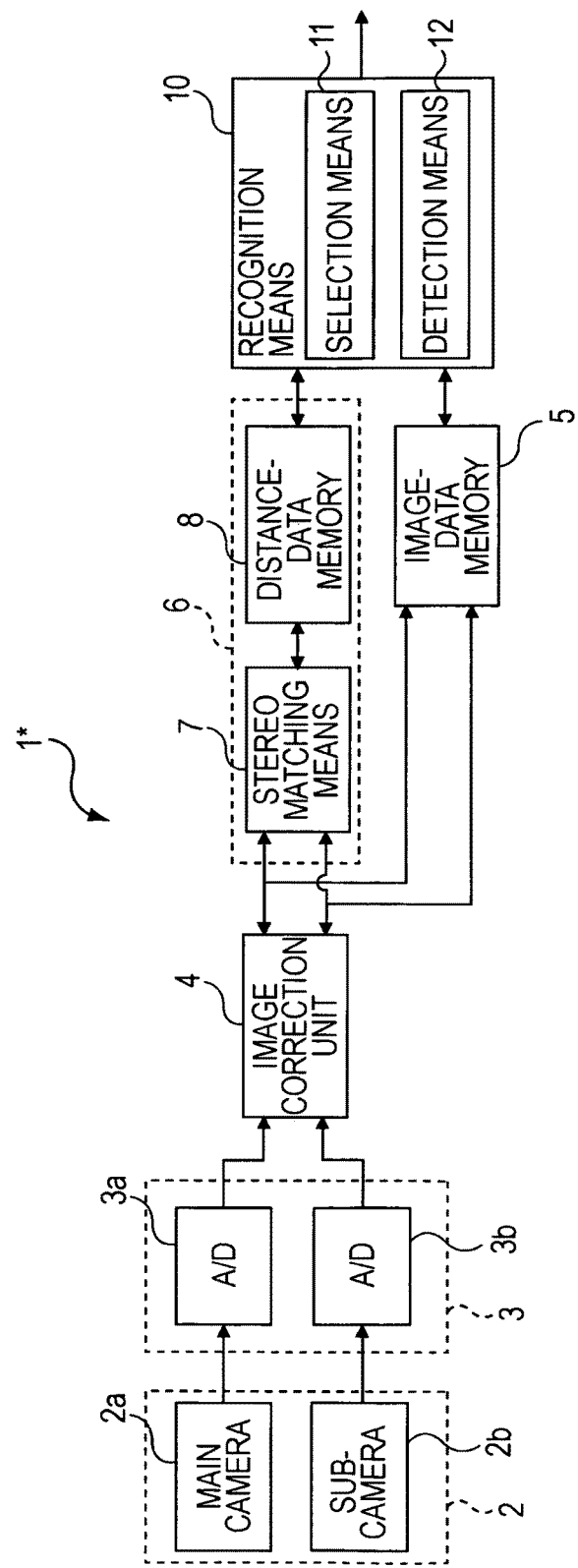
FIG. 16 is a block diagram showing a configuration of an environment recognition system including a single image processing means.

The above-described third to sixth modifications are different only in the method for processing the distance image $T_z$ formed on the basis of the reference image $T_0$ and the comparative image $T_c$. Therefore, the hardware configuration used until the distance image $T_z$ is formed does not always include two image processing means 6a and 6b shown in FIG. 1. A single image processing means 6 including a stereo matching means 7, such as an image processor, and a distance-data memory 8 will do, as shown in FIG. 16.

Conversely, in an environment recognition system 1* including a single image processing means 6 having a stereo matching means 7 and a distance-data memory 8, the superior one of a plurality of representative parallaxes dpn can be selected by changing the processing method for the distance image $T_z$. On the basis of the selected representative parallax, objects (three-dimensional objects) can be detected from the surrounding environment and the environment can be recognized.

Seventh Modification

In the above-described second to sixth modifications, pairs of images are formed by changing the image processing method for the reference image $T_0$ and the comparative image $T_c$ taken by the main camera 2a and the sub-camera 2b, or changing the processing method for the distance image formed on the basis of the reference image $T_0$ and the comparative image $T_c$. Alternatively, processing can be conducted on a first reference image $T_0 1$ and a first comparative image $T_c 1$ and a second reference image $T_0 2$ and a second comparative image $T_c 2$ that are taken by the main camera 2a and the sub-camera 2b by changing the image taking method and the image taking condition.

In this case, it is impossible to simultaneously take two types of images in different image taking conditions. However, when two types of images are taken at very close times by changing the image taking condition of the image taking means 2 and a first distance image $T_z 1$ and a second distance image $T_z 2$ are obtained, similarly to the above, calculated first and second representative parallaxes dpn1 and dpn2 can sufficiently serve as the material for selection of the representative parallax dpn of the section Dn. In this case, the image taking condition can be changed, for example, by changing the exposure amount and the shutter speed of the image taking means 2, switching the amplifier gain, or changing the selection of a LUT (lookup table) for determining the pixel brightnesses output from the image taking means 2.

Combination of the Embodiment and the Modifications

The embodiment and the first to seventh modifications described above can be adopted in combination. A superior representative parallax dpn can be selected from a plurality of types of representative parallaxes dpn that are obtained by changing the image taking method for obtaining a pair of images, the image processing method for the pair of images, and the processing method for the distance image. On the basis of the selected representative parallax dpn, objects (three-dimensional objects) can be detected from the surrounding environment and the environment can be recognized.

Switching of the Image Taking Method, the Image Processing Method, Etc.

The image taking method (image taking condition) for obtaining a pair of images, the image processing method for the pair of image, and the processing method for the distance image $T_z$ can be switched under a predetermined condition.

For example, in a backlit environment, objects can be properly detected by using the superior representative parallax in each section Dn in a distance image $T_z$ based on a reference image $T_0$ and a comparative image $T_c$ and an edge distance image $TE_z$ based on a reference edge image $TE_0$ and a comparative edge image $TE_c$. In contrast, at night, multiple noise components appear in the edge distance image $TE_z$ calculated from the reference edge image $TE_0$ and the comparative edge image $TE_c$. On the other hand, the dynamic range of the brightness of taken images can be expanded by changing the image taking method (image taking condition), as in the seventh modification.

Accordingly, for example, a distance image $T_z$ based on the reference image $T_0$ and so on and an edge distance image $TE_z$ based on a reference edge image $TE_0$ and so on can be used in the daytime. At night, an object to be compared with the distance image $T_z$ can be switched from the edge distance image $TE_z$ to a distance image formed on the basis of a pair of images taken in an image taking method (image taking condition) different from that for the reference image $T_0$ and the comparative image $T_c$.

When the image taking method, the image processing method, or the processing method for the distance image is thus switched in accordance with the surrounding environment, in the above-described example, it is possible to effectively cope with backlight in the daytime, and to expand the dynamic range of the brightness of the taken images at night. As a result, objects (three-dimensional objects) can be accurately detected from the surrounding environment, and the environment can be recognized.

What is claimed is:

1. An environment recognition system comprising:
   image taking means for taking a pair of images of the same object in a surrounding environment with a pair of cameras and outputting the pair of images;
   stereo matching means for conducting stereo matching on each of a plurality of pairs of images taken by different image taking methods or each of a plurality of pairs of images formed by subjecting a pair of taken images to different image processing methods, and for forming distance images in a one-to-one correspondence with the plurality of pairs of images by assigning calculated parallaxes to pixel blocks in the images;
   selection means for dividing the distance images into a plurality of vertical strip sections, calculating representative parallaxes respectively for the sections, selecting any of the representative parallaxes of corresponding sections in the distance images, and selecting the representative parallax for each of the sections; and
   detection means for detecting the object in the images on the basis of the representative parallaxes of the sections.

2. The environment recognition system according to claim 1, wherein the plurality of pairs of images taken by the different image taking methods are a plurality of pairs of images taken by changing an image taking condition of the image taking means.

3. The environment recognition system according to claim 1, wherein the plurality of pairs of images formed by subjecting the pair of taken images to the different image processing methods are pairs of images taken by the image taking means, pairs of images obtained by subjecting the pair of taken images to edge processing, pairs of images formed by making resolutions of the pair of taken images different, or pairs of images formed by making brightnesses of the pair of taken images different.

4. The environment recognition system according to claim 1, wherein the selection means forms the pairs of images by changing a threshold value at which noise is removed from the distance images.

5. The environment recognition system according to claim 1, wherein a pixel width of the sections is different between the distance images formed on the basis of the taken pair of images, and the selection means calculates representative parallaxes respectively for the sections, selects any of the representative parallaxes of the corresponding section as a representative parallax of the section, and selects a representative parallax for each of the sections.

6. The environment recognition system according to claim 1, wherein the selection means forms a histogram for each of the sections of the distance images formed respectively for the pairs of images, and calculates the mode of the histogram as the representative parallax on the basis of frequencies of the parallaxes in the histogram.

7. The environment recognition system according to claim 6, wherein the selection means selects, from the representative parallaxes of the corresponding section in the distance images formed respectively for the pairs of images, one of a representative parallax having the highest frequency, a representative parallax based on a histogram having the smallest variance, a representative parallax having the largest mode, and a representative parallax that provides the shortest distance to the object in a current sampling period estimated from a position of the object detected in a previous sampling period, and sets the selected representative parallax as a representative parallax of the section.

8. The environment recognition system according to claim 6, wherein the selection means forms a plurality of histograms for each of the sections of the distance images, the histograms being different in at least one of the maximum value, the minimum value, and a class width, and calculates the representative parallax for each of the histograms.

9. An environment recognition system comprising:
  image taking means for taking a pair of images of the same object in a surrounding environment with a pair of cameras and outputting the pair of images;
  stereo matching means for conducting stereo matching on the pair of images and for forming a distance image by assigning calculated parallaxes to pixel blocks in the images;
  selection means for dividing the distance image into a plurality of vertical strip sections, calculating a plurality of different kinds of representative parallaxes for each of the sections, and selecting any of the representative parallaxes of each of the sections as a representative parallax of the section; and
  detection means for detecting the object in the images on the basis of the representative parallaxes of the sections,
  wherein the selection means forms a histogram for each of the sections, calculates the mode of the parallaxes in the histogram as the representative parallax, and calculates the plurality of representative parallaxes by using a plurality of histograms that are different in at least one of the maximum value, the minimum value, and a class width, as the histogram for each of the sections.

10. The environment recognition system according to claim 1, wherein the selection means selects any of the representative parallaxes to which a predetermined weight is assigned.

11. The environment recognition system according to claim 1, wherein the image taking method for obtaining the pair of images, the image processing method for the pair of images, or a method for processing the distance image is switched.

12. The environment recognition system according to claim 11, wherein the image taking method, the image processing method, or the method for processing the distance image is switched in accordance with the surrounding environment.

13. The environment recognition system according to claim 1, wherein the object is a three-dimensional object existing above a datum plane.

14. The environment recognition system according to claim 1, wherein the stereo matching means and the selection means operate by using distances and representative distances uniquely correlated to the parallaxes and the representative parallaxes according to the principle of triangulation, instead of the parallaxes and the representative parallaxes.

15. The environment recognition system according to claim 1, wherein said selection means selects representative parallaxes from each of the corresponding sections in the distance images, and said detection means detects objects based on selections derived from each of said distance images.

16. The environment recognition system according to claim 15, wherein said selection means is configured to switch to different criteria based on different environmental situations faced by said image taking means.

17. The environment recognition system according to claim 1, wherein said stereo matching means conducts stereo matching on each of a plurality of pairs of images, which pairs of images are produced by respective different image taking methods.

18. The environment recognition system according to claim 1, wherein said stereo matching means conducts stereo matching on each of a plurality of pairs of images, which pairs of images are produced by subjecting the pair of taken images to respective, different image processing methods.

19. The environment recognition system according to claim 1, wherein said selection means is configured to select a first kind of representative parallax over a second kind of representative parallax at a common distance image vertical section location based on a determination the first representative parallax is superior to the second representative parallax at that distance image vertical section location under current environment condition of the image taking means.

20. An environment recognition system comprising:
  image taking means for taking a pair of images of the same object in a surrounding environment with a pair of cameras and outputting the pair of images;
  stereo matching means for conducting stereo matching on the pair of taken images forming one or more distance images by assigning calculated parallaxes to pixel blocks in the taken images;
  selections means for dividing the one or more distance images into a plurality of vertical strips sections, calculating a plurality of different kinds of representative parallaxes for common or corresponding distance image sections, and selecting any of the different kinds of representative parallaxes of each of the sections as a representative parallax of the section; and
  detection means for detecting the object in the taken images on the basis of the selected representative parallaxes of the section, and
  wherein the plurality of representative parallaxes are calculated on the basis of a plurality of the distance images that are different in a threshold value at which noise is removed from the distance images, and wherein the selecting of any of the different kinds of representative parallaxes of each of the sections as a representative parallax of the section includes choosing amongst corresponding distance image sections of two distance images produced by said stereo matching means.

* * * * *